OR 4,045,121

United States Patent [19]
Clark

[11] 4,045,121
[45] Aug. 30, 1977

[54] OPTICAL FIBER CONNECTOR

[75] Inventor: Kenneth M. Clark, Beaumont, Calif.

[73] Assignee: The Deutsch Company Electronic Components Division, Banning, Calif.

[21] Appl. No.: 651,285

[22] Filed: Jan. 22, 1976

[51] Int. Cl.² ............................................. G02B 5/16
[52] U.S. Cl. ................................. 350/96 C; 350/96 B
[58] Field of Search .............. 350/96 C, 96 B, 96 WG

[56] References Cited

U.S. PATENT DOCUMENTS

| | | | |
|---|---|---|---|
| 3,734,594 | 5/1973 | Trambarulo | 350/96 C |
| 3,885,859 | 5/1975 | Dalgleish et al. | 350/96 C |
| 3,912,574 | 10/1975 | Cherin et al. | 350/96 C |
| 3,919,037 | 11/1975 | Miller | 350/96 C |
| 3,922,064 | 11/1975 | Clark et al. | 350/96 C |
| 3,923,371 | 12/1975 | Dalgleish | 350/96 C |

FOREIGN PATENT DOCUMENTS 2,512,007   9/1975   Germany ............................ 350/96 C Primary Examiner—John K. Corbin
Assistant Examiner—Stewart Levy
Attorney, Agent, or Firm—Gausewitz, Carr & Rothenberg

[57] ABSTRACT

This invention provides a connector for optical fibers which includes two connector sections each of which has a means for holding an optical fiber, one of the sections having an inclined surface engaged by the end portions of both of the fibers where their end faces abut. One of the fibers is bent to its position of engagement with the inclined surface as held in one section of the connector. The other of the optical fiber is bent by the inclined surface as the two connector sections are brought together to a mated position.

33 Claims, 10 Drawing Figures

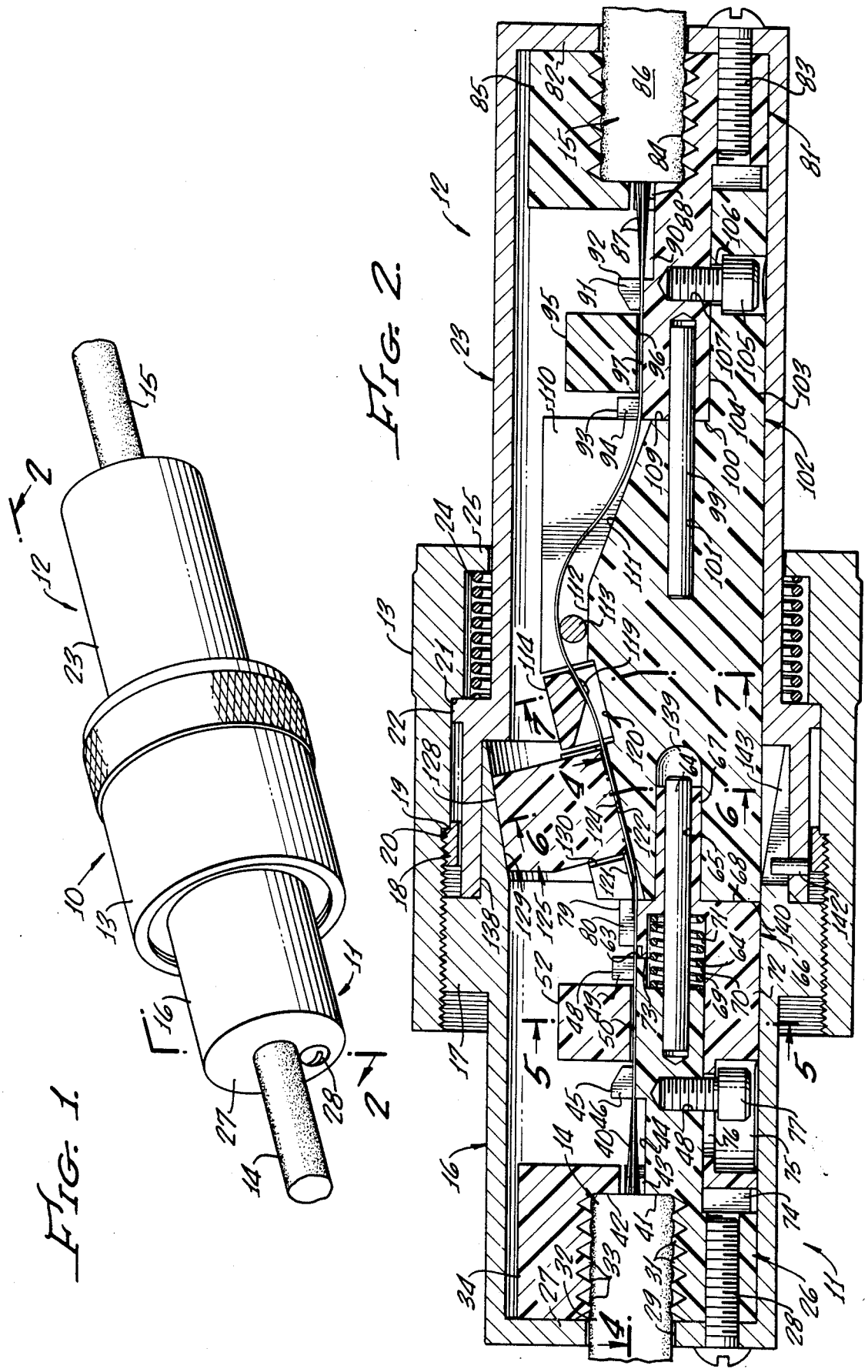

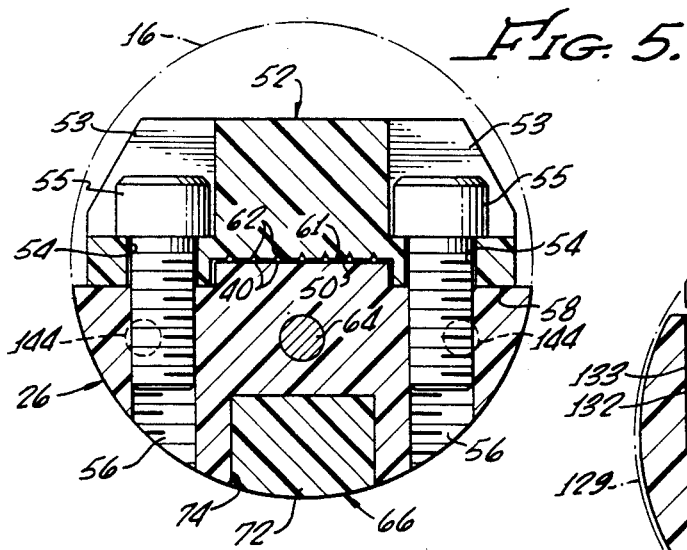
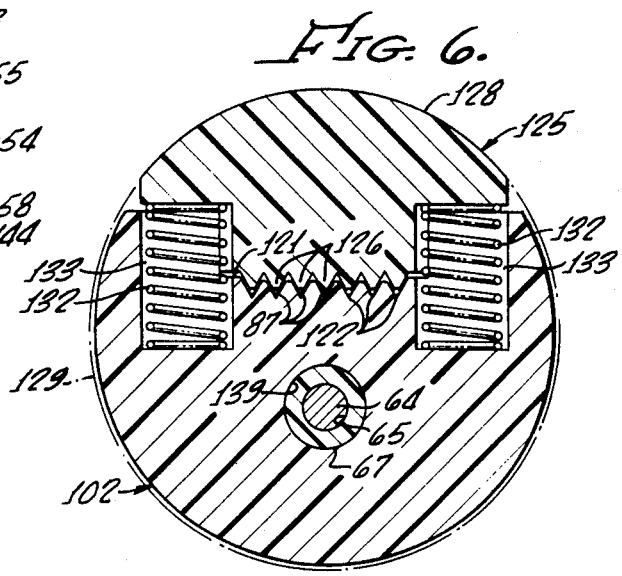
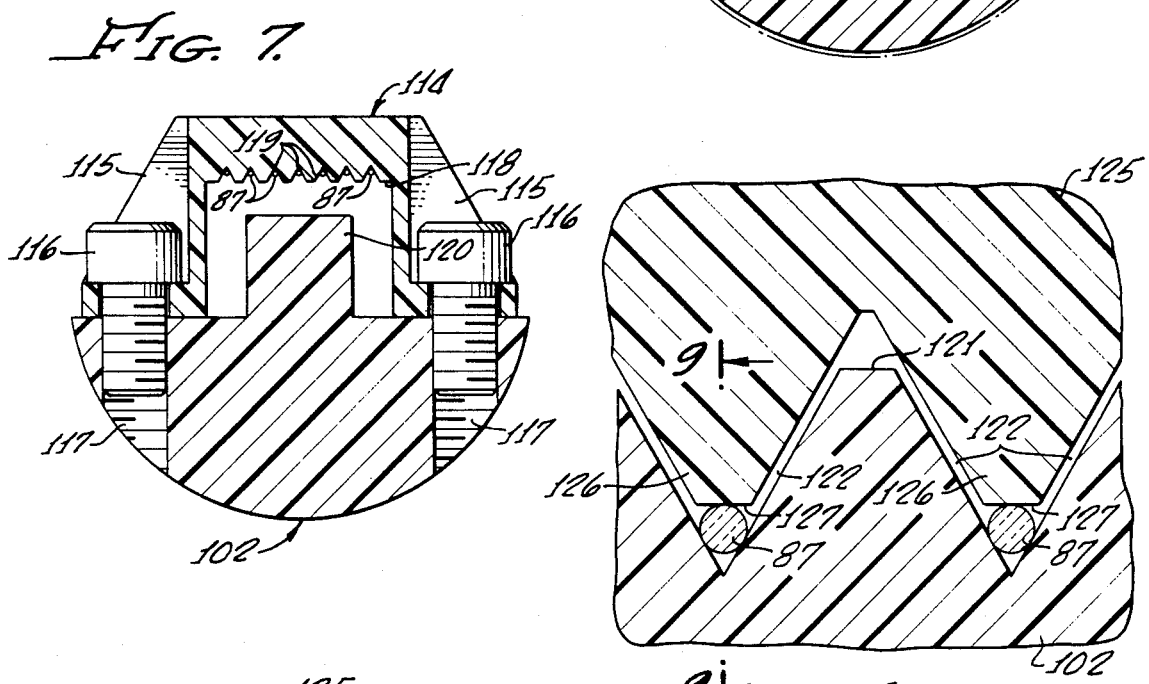
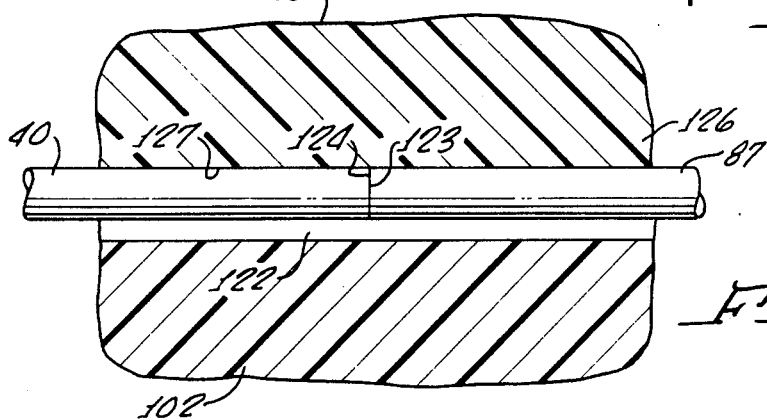

OPTICAL FIBER CONNECTOR

BACKGROUND OF THE INVENTION

1. Field of the Invention

This invention pertains to a connector for optical fibers

2. Description of the Prior Art

Light can be transmitted from one optical fiber to another by providing the fibers with radial end faces which are held in interengagement. In order to accomplish efficient light transmission it is necessary to achieve precise alignment of the connected optical fibers. The axes of the two fibers should meet and there should be no angularity between them. A practical connector suitable for field use also requires repeatability such that accurate fiber alignment is achieved each time the connector is mated. The mating of the connector should be capable of being accomplished with relative ease and without the use of instruments or through making adjustments. A further desirable feature is the ability to inspect the fibers when the connector is in its separated condition to ascertain if any have been damaged. In the past no optical fiber connecting devices have effectively accomplished these objectives.

SUMMARY OF THE INVENTION

The present invention overcomes the problems noted above, providing an optical fiber connector that automatically aligns the fibers as the connector is mated in an operation, that is operated easily and without requiring skill or adjustments. The connector includes two sections, each of which receives the end portion of a cable containing a plurality of optical fibers. In each connector section the fibers are separated and positioned in spaced parallelism. One of the sections includes an inclined ramp having grooves in its surface which receive the end portions of the individual fibers associated with that connector section. The fibers are bent so that their own resilience causes them to exert a lateral force so that they make intimate contact with the surfaces of the groove. (The concept of lateral fiber bending is set forth in patent application Ser. No. 630,548, filed Nov. 10, 1975, for Arrangement for Positioning and Connecting Optical Fibers, by Walter L. Johnson.) These optical fibers are rigidly held at a location remote from the inclined ramp while an open space where the fibers may flex is provided between the ramp and the holding means. This permits some axial movement of these fibers relative to the ramp.

The other connector section positions its optical fibers so that they extend outwardly beyond the forward end of that part of the connector. There is an outwardly projecting support for these optical fibers which holds them at a location inwardly of but close to their outer ends. When the connector sections are relatively advanced toward each other the optical fibers that project outwardly from the second connector section are caused to engage the inclined ramp of the first section, entering its grooves. Continued relative advancement forces these optical fibers along the grooves bending the fibers upwardly as this occurs, as these fibers also exert lateral forces causing them to bear firmly against the surfaces of the grooves. The outwardly projecting support is displaced inwardly as the advancement occurs. Ultimately the ends of the fibers in the second section engage the ends of the fibers in the first section. Provision is made for overtravel so that the fibers in the second section displace the fibers in the first section a short distance in the grooves allowing the first fibers to flex in the open space provided for this purpose. As a result, the fibers are in compression at the interface and there is intimate contact between the ends of the fibers. This holds true even though the fiber ends in each set are not necessarily in precise transverse alignment.

The connector also includes a clamping element that has ridges which enter the grooves in the inclined ramp engaging the upper surfaces of the fibers in each set, holding them within the grooves and in alignment. This clamping member is cammed inwardly to its position of engagement with the fibers automatically as the connector is mated.

In the resulting connection there is continuous surface on all sides of each of the fibers at the location of the interface between the fibers of the two sets, giving secure fiber support. The connection is made quite easily and rapidly with no adjustments being required afterward. The fibers are effectively aligned and the results are obtained each time the connector is mated. When the connector is opened up the individual fibers may be inspected to be certain that no damage has occurred.

BRIEF DESCRIPTION OF THE DRAWINGS

FIG. 1 is a perspective view of the connector of this invention in the mated position;

FIG. 2 is a longitudinal sectional view of the connector taken along line 2—2 of FIG. 1;

FIGS. 5, 6 and 7 are enlarged transverse sectional views taken along lines 4—4, 5—5 and 6—6, respectively, of FIG. 2;

FIG. 8 is a further enlarged fragmentary view, showing a portion of the fiber engaging arrangement that appears at the central part of FIG. 6;

FIG. 9 is a fragmentary longitudinal sectional view taken along line 9—9 of FIG. 8.

DESCRIPTION OF THE PREFERRED EMBODIMENT

Figure 3:
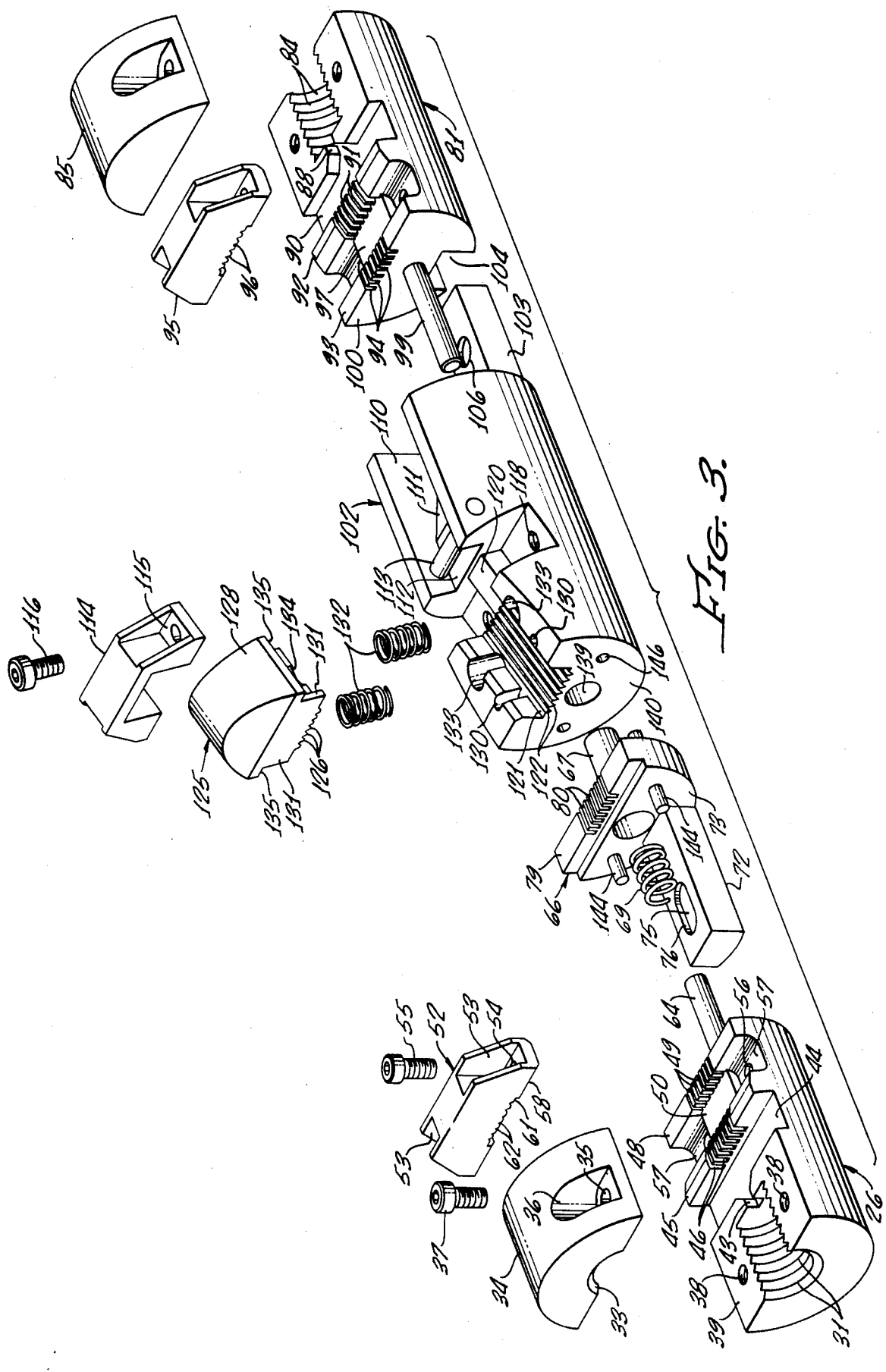
FIG. 3 is an exploded perspective view of the components of the connector.

The connector 10 of this invention, as shown in FIG. 1, is made up of a receptacle 11 and a plug 12, held together by an internally threaded coupling ring 13. It is used to interconnect the individual optical fibers of multifiber cables 14 and 15. The cable 14 enters the receptacle 11 of the connector 10 where it is held and its optical fibers are suitably positioned, while a similar function is provided by the plug 12 for the optical fibers of the cable 15. The fibers of the cables 14 and 15, made of glass or plastic, are flexible and have resilience.

The receptacle 11 includes a tubular shell 16 having an exteriorly threaded radially enlarged portion 17 which is engaged by the internal threads of the forward end of the coupling ring 13. An exteriorly threaded retainer ring 18 also engages the threads of the coupling ring 13 with its shoulder 19 engaging an internal shoulder 20 of the coupling ring adjacent the inner end of the coupling ring threads. Inwardly of the shoulder 20, the coupling ring 13 has another internal annular shoulder 21 which engages the rearward side of an annular flange 22 on the tubular shell 23 of the plug 12 when the connector is mated, as in FIG. 2. The threaded engagement of the coupling ring with the receptacle shell 16 at the portion 17, together with the interengagement of the shoulder 21 and the flange 22, holds the two sections 11 and 12 of the connector together. In this position the forward end of the receptacle shell 16 telescopes into the plug shell 23. When the coupling ring 13 is loosened from the receptacle shell 16, the inner end of the retainer ring 18 can engage the flange 22 of the plug shell 23 to hold the coupling ring to the plug shell. A compression spring 24 between the flange 22 of the plug shell 23 and an internal flange 25 at the rearward end of the coupling ring 13 biases the coupling ring to this position.

At the rearward end of the receptacle 11 is a base member 26 which engages a flange 27 at the rearward end of the shell 16. A longitudinally directed screw 28 holds the base member 26 to the shell 16. The flange 27 defines a circular opening 29 through which the cable 14 passes. Inwardly of the opening 29, the base member 16 has a substantially semicylindrical recess defined by a plurality of circumferentially extending V-shaped ridges 31. The lower surface of the protective outer covering 32 of the cable 14 rests on the ridges 31 while its upper surface is engaged by generally similar ridges 33 of a clamp 34. The latter member includes openings 35 in its opposite sides with recesses 36 above them. They receive screws 37 that extend downwardly into tapped openings 38 in the rearward upper surface 39 of the base 26. The ridges 33 of the clamp 34 extend through slightly less than 180° so that when the screws 37 are tightened the end portion of the cable 14 is gripped between the clamp 34 and the base 26, securely held by the ridges 31 and 33 at the longitudinal axis of the receptacle 11.

Within the connector, the covering 32 is removed from the individual fibers 40 of the cable 14, with the end of the covering 32 engaging radial shoulders 41 and 42 of the base 26 and clamp 34, respectively. The fibers 40 extend beyond the cable end through an upwardly facing notch in the shoulder 41. Forwardly of the notch 43 is an open space above an upwardly facing central horizontal surface 44 of the base that extends to a transverse ridge 45. The latter element includes upwardly facing, parallel, longitudinally aligned notches 46, equally spaced across the central portion of the ridge. The notches 46 are equal in number to the fibers 40 of the cable 14, in the example shown there being seven fibers 40 and hence seven notches 46. The fibers 40 are spread out laterally within the open space above the horizontal surface 44, with one fiber 40 extending through each of the notches 46.

A second transverse ridge 48 is positioned forwardly of the ridge 45 and spaced from it. The ridge 48 includes notches 49 which are similar to the notches 46. That is to say, the notches 49 are upwardly facing, parallel and equal in number to the fibers 40. The notches 49 are longitudinally aligned with the notches 46.

Between the notches 46 and 49 in the ridges 45 and 48, the base 26 includes a flat upwardly facing horizontal surface 50. This surface is at the same height as the bases of the notches 46 and 49, forming a continuation of the flat horizontal inner end surfaces of these notches. The fibers 40 rest upon the surface 50 where they are spread apart transversely of the connector, guided by the notches 46 and 49 so that they are in parallelism.

A second clamp 52 fits between the ridges 45 and 48, over the surface 50 of the base 26. The side portions of the clamp 52 include recesses 53 leading to openings 54 through which screws 55 extend. Tapped openings 56 in the surfaces 57, transversely outwardly of and recessed below the surface 50, receive the screws 55 which thereby hold the clamp 52 to the base 26. The bottom surface 58 of the clamp 52 engages the surfaces 57 of the base.

The central portion 62 of the bottom surface 58 of the clamp 52 is recessed to a flat, horizontal surface in which are formed V-shaped grooves 62 that are equal in number to the optical fibers 40 of the cable 14. The grooves 62 are aligned with the notches 46 and 49, being parallel to each other and extending longitudinally of the connector. One fiber 40 fits within each of the grooves 62. This accurately locates the fibers 40 as they are centered by the tapered walls of the V-shaped grooves. The parts are proportioned so that the walls of the V-shaped grooves 62 cooperate with the surface 50 of the base 22 to firmly anchor the fibers 40. This hold the fibers 40 in a single plane in which the axis of the cable 14 also lies.

Projecting beyond the forward end 63 of the base 26 in the longitudinal direction is a guide pin 64 which fits in a longitudinal opening 65 in a slide member 66. The opening 65 extends into the central part of the slide 66, and through a tubular extension 67 that projects beyond the slide's forward end 68. One end of a compression spring 69 is received within a recess 70 in the forward end 64 of the base member 26, the other end of the spring being in a counterbore 71 of the opening 65 in the slide 66. The spring 69, therefore, biases the slide 66 forwardly relative to the base member 26.

The slide 66 includes an elongated extension 72 which extends rearwardly from the rearwardly facing wall 73 of the slide and fits within a longitudinal slot 74 on the underside of the base 26. At the rearward portion of the extension 72 is a downwardly facing recess 75 which is elongated longitudinally of the connector. A longitudinally elongated opening 76 extends through the upper wall of the extension 72 at the recess 75 for receiving the shank of a screw 77. The end of the screw shank is received in a tapped opening 78 in the base member 26, positioning the head of the screw 77 within the recess 75 beneath the opening 76. The diameter of the head of the screw 77 is greater than the lateral dimension of the opening 76 so that the screw serves to hold the slide 66 to the base 26 by limiting the forward movement of the slide 66 under the bias of the spring 69 when the connector is in a separated condition.

The upper surface of the slide 66, intermediate its ends, includes a transverse ridge 79, having upwardly facing notches 80 so that it provides a comb-like element that guides the optical fibers 40. Thus, the notches 80 are parallel to each other, and aligned longitudinally of the connector and with the notches 46 and 49.

The plug 12 of the connector 10 includes at its rearward end a base 81 which is similar to the base 26 of the receptacle 11. The base 81 is attached to the rearward end flange 82 of the plug shell 23 by a screw 83. The base 81 has a ridged rearward recess 84 that cooperates with the ridged recess of a rearward clamp 85 to grip the periphery of the protective outer covering 86 of the end of the optical fiber cable 15 as it enters the plug 12. This holds the end of the cable 15 so that it is axially aligned with the cable 14 at the opposite end of the connector 10. The individual fibers 87 of the cable 15 extend beyond the cable through an opening 88 in the base 81, at the forward end of the clamp 85, being separated at an open space 90 to enter guide notches 91 in a transverse ridge 92. A second transverse ridge 93 at the forward end of the base 81 has upwardly facing guide notches 94 through which the fibers 87 also extend. A second clamp 95, which is similar to the clamp 52, has V-shaped grooves 96 in its central undersurface portion which receive the optical fibers 87. With the clamp 95 secured to the base 81, the fibers 87 are gripped between the walls of the V-shaped grooves 96 and the flat transverse upper surface 97 of the base 81 between the ridges 91 and 93. At this location the fibers 87 are parallel and in a plane that includes the axis of the cable 15.

A pin 99 extends longitudinally forwardly from the forward end 100 of the base 81, entering an opening 101 in an anvil 102. The latter element includes a rearward extension 103 which fits within a longitudinal slot 104 in the base 81 that extends rearwardly from the forward end 100 of the base. A screw 105 extends through an opening 106 in the rearward extension 103 of the anvil 102 and into a tapped hole 107 in the base 81 to secure the anvil to the base, so that there is no relative movement of these parts in the assembled connector.

The anvil 102 includes a transverse rearwardly facing surface 109 which engages the forward end 100 of the base 81. Forwardly of the surface 109, on the upper side of the anvil 102, is a relatively large longitudinally extending slot bounded on its sides by parallel walls 110. A flat surface 111 inclines upwardly from the surface 109 and forms the rearward bottom portion of the longitudinal slot in the anvil between the walls 110. The rearward edge of the surface 111, at the surface 109, is below the bases of the notches 94 in the ridge 93 of the base 81. Connecting to the upper end of the inclined surface 111, between the forward portions of the walls 110, is a flat horizontal transverse surface 112 of the anvil 102. Above the forward horizontal surface 112 is a transverse cylindrical pin 113 that extends between the side walls 110. The fibers 87 of the cable 15 extend over the upper side of the pin 113, so that the fibers are bent upwardly from the clamp 95 to the pin 113.

Forwardly of the pin 113 is a guide 114 which has recessed and apertured side portions 115 that receive screws 116 which extend into tapped openings 117 in the anvil 102 to hold the guide 114 to the anvil. The central undersurface 118 of the guide 114 is provided with V-shaped grooves 119 which incline downwardly toward the forward end of the plug. These grooves are equal in number to the optical fibers 87 and have the same lateral spacing as the grooves 92 and 94 in the ridges 91 and 93. The optical fibers 87 fit beneath the guide 114 where they wedge into the walls of the V-shaped grooves 119. This bends the fibers 87 downwardly while maintaining them in a predetermined spacing, parallel to each other. The anvil 102 beneath the guide 114, including a central longitudinal ridge 120, inclines downwardly and forwardly, and is spaced from the undersurface 118 of the guide.

Forwardly of the guide 114 and below it, the anvil 102 includes a downwardly and forwardly inclined ramp 121. V-shaped grooves 122 are formed in the ramp 121, these grooves being parallel and aligned with the various previously described grooves and notches of the plug that receive and guide the optical fibers. The spacing of the grooves 122 is equal to that of the spacing of the optical fibers 40 of the receptacle 11 as given to them by the guide openings of that element. The end portions of both the optical fibers 40 of the cable 14 and the optical fibers 87 of the cable 15 are received in the grooves 122. The flat radial end surfaces 123 and 124 of the optical fibers 40 and 87, respectively, butt against each other at the midportion of the ramp 121 so that light can be transmitted from one set of optical fibers to the other.

The guide 114 is positioned sufficiently lower than the pin 113 to bend the fibers 87 downwardly at a greater angle than that of the ramp 121. Hence, the fibers 87, through their resilience, exert a lateral force against the ramp 121. This biases the fibers 87 into the grooves 122, wedging them toward the bases of these grooves.

The optical fibers 40, projecting forwardly from where they are gripped by the clamp 52, are bent upwardly by the ramp 121, as a result of the ramp's inclination. The resilience of the bent fibers 40 causes them to exert a lateral force against the ramp, urging them into the bases of the grooves 122. Thus, the resilience of the fibers 40 and 87 is utilized in causing them to make intimate contact with the walls of the grooves 122, which in turn assists in obtaining precise end-to-end alignment of the optical fibers.

There is, in addition, a clamp 125 which fits over the end portions of the fibers 40 and 87 to assist in holding them in the grooves 122. The lower surface of the clamp 125 is made up of ridges 126 having flat lower longitudinal edges 127 (see FIG. 8) which are aligned with the grooves 122 of the anvil 102, entering the grooves to engage the fibers 40 and 87. The clamp 125 includes a rounded upper surface 128 defined by a conical segment. This surface is complementary to the outwardly flaring inside end surface 129 of the receptacle shell 16. Consequently, when the connector is mated and the clamp 125 is received within the end of the receptacle shell 16, the surface 129 of the receptacle shell reacts against the surface 128 of the clamp 125 to urge the clamp downwardly toward the ramp 121 of the anvil 102. This causes the outer edges 127 of the ridges 126 to engage the fibers 40 and 87 within the grooves 122.

The clamp 125 is guided in a path perpendicular to the ramp 121 by opposed grooves 130 at the side edges of the ramp 121 which extend upwardly at 90° to the ramp. Received in the grooves 130 are flanges 131 at one end of the clamp 125, which cooperate with the walls of the grooves 130 to hold the clamp 125 against movement longitudinally of the ramp 121.

The clamp 125 is biased away from the ramp 121 by a pair of compression springs 132. These springs are received inside recesses 133 in the anvil next to the ramp 121, extending along recessed side areas 134 of the clamp 125 to engage downwardly facing shoulders 135 of the clamp. Therefore, the springs 132 press upwardly on the clamp 125.

Figures 4, 10:
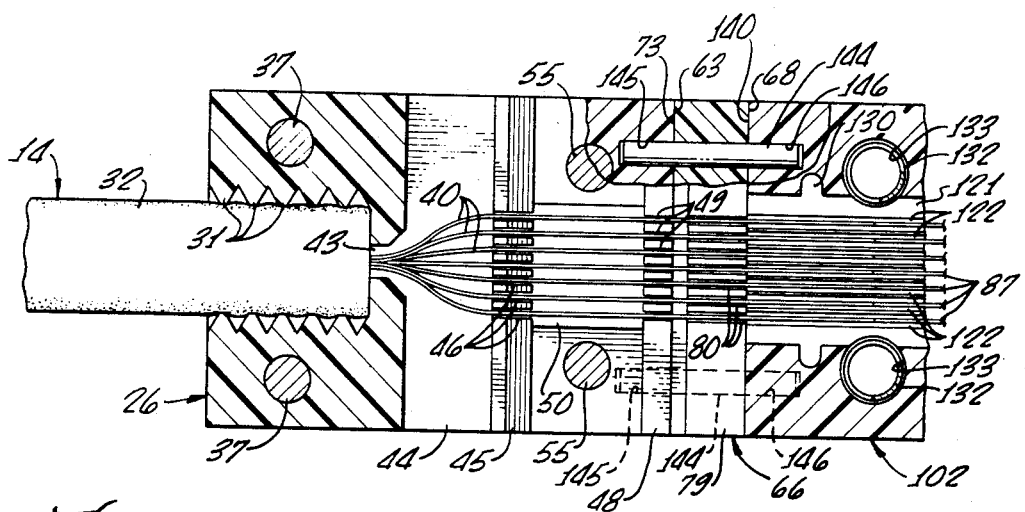
FIG. 4 is a fragmentary longitudinal sectional view taken along line 4—4 of FIG. 2.
FIG. 10 is a fragmentary longitudinal sectional view of the connector components in a separated condition.

When the plug and receptacle of the connector 10 are separated, as shown in FIG. 10, the clamp 125 is withdrawn from the surface 129 of the receptacle shell 16. The springs 132 force the clamp upwardly to where it engages the inner surface 138 of the plug shell 23, releasing the ends of the fibers 40 and 87. However, the resilience of the fibers 87 keeps them at the bases of the grooves 122. In the receptacle 11, the ends of the fibers 40 project forwardly beyond the notches 80 and the forward end 68 of the member 66. The compression spring 69 shifts the member 66 forwardly away from the end 63 of the base 26 so that the bottom surfaces of the notches 80 support the fibers 40 adjacent their ends.

When the connector is to be mated, the tubular forward end 67 of the slide member 66 enters a cylindrical opening 139 that extends longitudinally inwardly of the forward end 140 of the anvil 102. This helps guide the plug and receptacle together. The ends of the fibers 40 then engage the surfaces of the grooves 122 in the ramp 121. As they slide along the ramp 121, the fibers 40 are bent upwardly causing them to lie against the walls of the grooves 122. Ultimately, the fibers 40 reach a position where their ends 123 engage the ends 124 of the fibers 87.

To assure that the ends of the mating fibers are brought into a firm abutting relationship, some overtravel of the fibers 40 is provided for. This is accomplished by making the fibers 40 and 87 of sufficient lengths to cause their end surfaces 123 and 124 to be brought into interengagement slightly ahead of the fully mated position of the connector. Thus, as the plug and receptacle are advanced toward each other and the ends of the fibers are brought into interengagement, the fibers 40 push the fibers 87 rearwardly, which merely causes slight additional bending of the fibers 87 in the area rearwardly of the transverse pin 113. The overtravel of the fibers 40 means that the ends of each set of fibers need not be in precise transverse alignment prior to mating of the connector.

As full mating of the connector is achieved, the flared surface 129 at the forward end of the receptacle shell 16 engages the inclined surface 128 of the clamp 125, reacting against this surface of the clamp to cam the clamp downwardly against the ramp 121 so that its ridges 126 engage the fibers within the grooves 122.

The plug shell 23 and receptacle shell 16 are rotationally aligned by a radial pin 142 at the forward end of the plug shell that enters a longitudinal slot 143 in the forward end of the receptacle shell.

Alignment of fiber supporting components of the plug and receptacle is accomplished by means of two parallel pins 144 projecting from the forward and rearward ends 68 and 73 of the member 66. The rearward portions of the pins 144 enter complementary openings 145 that extend longitudinally inwardly from the forward end face 63 of the base member 26. Similar openings 146 extend rearwardly into the anvil 102 from its forward end face 140. The pins 144 and the openings that receive them assure that the fibers 40 are aligned with the grooves 122 and are at an angle to the inclined ramp 121 as the connector sections are advanced to the mated position.

The mating of the connector is completed when the member 66 is forced rearwardly by the anvil 102 to a position where its rearward face 73 engages the forward end 63 of the base 26 of the receptacle.

The foregoing detailed description is to be clearly understood as given by way of illustration and example only, the spirit and scope of this invention being limited solely by the appended claims.

I claim:

1. An optical waveguide connector comprising
  a first element having an inclined surface means,
  a second element,
  at least one first optical fiber having resilience,
  means on said first element for holding said first optical fiber with an end portion thereof on said inclined surface means,
  at least one second optical fiber having resilience,
  means on said second element for holding said second optical fiber so as to have an outwardly facing end portion,
  and means for aligning said first and second elements such that said end portion of said second optical fiber is at an angle to said inclined surface means and upon relative advancement of said first and second elements toward each other said end portion of said second optical fiber is caused to engage said inclined surface means and be bent thereby so as to slide therealong to a location where the end thereof engages the end of said first optical fiber.

2. In combination with at least one first optical fiber having resilience, and at least one second optical fiber having resilience, a device for connecting said first optical fiber to said second optical fiber for transmitting light therebetween comprising
  a first element including
    means for holding said first optical fiber so as to extend in a first direction,
      said first optical fiber having an end portion extending beyond said means for holding said first optical fiber,
    a surface inclined relative to said first direction,
    and positioning means for positioning said end portion of said first optical fiber so as to lie along said inclined surface with the outer end of said first optical fiber at an intermediate portion of said inclined surface,
      said positioning means including means for bending said first optical fiber so that said end portion thereof exerts a lateral force against said inclined surface,
  a second element having a forward end, said second element including,
    means for holding said second optical fiber so as to extend in said first direction,
      said second optical fiber having an end portion extending beyond said means for holding said second optical fiber and projecting beyond said forward end of said second element,
    said first and second elements having a mated position in which said end portion of said second optical fiber lies along said inclined surface and is bent thereby so that said second optical fiber exerts a lateral force against said inclined surface, and the outer end of said second optical fiber abuts said outer end of said first optical fiber,
  and releasable connecting means for holding said first and second elements in said mated position and permitting said first and second elements to be moved away from each other to a separated condition upon release of said releasable connecting means.

3. An optical waveguide connector comprising
  a first element having an inclined surface means,
  a second element,
  a plurality of first optical fibers having resilience,
  means on said first element for holding said first optical fibers in spaced parallelism with end portions thereof on said inclined surface means,
    said means for holding said first optical fibers including means for bending said first optical fibers so that said first optical fibers exert a resilient force urging the same against said inclined surface means,
  a plurality of second optical fibers having resilience,
  means on said second element for holding said second optical fibers in spaced parallelism so as to have a spacing therebetween substantially equal to the spacing of said first optical fibers, and to have outwardly facing end portions, and means for aligning said first and second elements including means for positioning the end portions of said second optical fibers at an angle relative to said inclined surface means such that upon relative advancement of said first and second elements toward each other said second optical fibers are caused to engage said inclined surface means and be bent thereby and exert a force against said inclined surface means to produce intimate contact therewith and along said inclined surface means to a location where the ends thereof engage the ends of said first optical fibers, said second element including, an outwardly projecting portion engaging and supporting said end portions of said second optical fibers, said outwardly projecting portion being engageable with said first element upon said relative advancement of said first and second elements toward each other for pushing said outwardly projecting portion inwardly so as to enable said second optical fibers to so engage said inclined surface means.

4. A device as recited in claim 3 in which said projecting portion includes guide means for holding the end portions of said second optical fibers in spaced parallelism.

5. A device as recited in claim 4 including resilient means biasing said projecting portion outwardly, said projecting portion being so movable inwardly in opposition to said resilient means when said first and second elements are so advanced relatively toward each other.

6. An optical waveguide connector comprising a first element having an inclined surface means, a second element, a plurality of first optical fibers having resilience, means on said first element for holding said first optical fibers in spaced parallelism with end portions thereof on said inclined surface means, a plurality of second optical fibers having resilience, means on said second element for holding said second optical fibers in spaced parallelism so as to have a spacing therebetween substantially equal to the spacing of said first optical fibers, and to have outwardly facing end portions, and means for aligning said first and second elements including means for positioning the end portions of said second optical fibers at an angle relative to said inclined surface means such that upon relative advancement of said first and second elements toward each other said second optical fibers are caused to engage said inclined surface means and be bent thereby and exert a force against said inclined surface means to produce intimate contact therewith and so as to slide along said inclined surface means to a location where the ends thereof engage the ends of said first optical fibers.

7. A device as recited in claim 6 in which said means for holding said first optical fibers includes means for bending said first optical fibers so that said first optical fibers exert a resilient force urging the same against said inclined surface means.

8. A device as recited in claim 7 including in addition means movable downwardly against the end portions of said first and second fibers upon said relative advancement of said first and second elements for holding said first and second fibers in alignment in said grooves.

9. A device as recited in claim 7 in which said inclined surface means is provided with a plurality of grooves therein, said first optical fibers lying in said grooves, and said aligning means includes means for aligning said second optical fibers with said grooves for entering the same to engage said first optical fibers upon said relative advancement of said first and second elements.

10. A device as recited in claim 7 in which said means for positioning said first optical fibers includes means for permitting limited axial displacement of said first optical fibers relative to said inclined surface means, and said holding means for said first optical fibers and said holding means for said second optical fibers include means for positioning the ends of said first and said second optical fibers such that upon said relative advancement of said first and second elements and said engagement of said ends of said optical fibers said first optical fibers are displaced by said second optical fibers so as to move relative to said inclined surface means for assuring intimate contact of the end surfaces of said first and second optical fibers.

11. A device as recited in claim 10 in which for permitting said relative axial displacement of said first optical fibers and said inclined surface means, said first element includes means remote from said inclined surface means for gripping said first optical fibers, and defines an open space intermediate said gripping means and said inclined surface means for permitting flexure of said optical fibers in said open space upon such displacement of said first optical fibers.

12. A device as recited in claim 11 in which said means for holding said second optical fibers includes means for precluding substantial movement of said second optical fibers relative to said second element at a location inwardly of said outer end portions of said second optical fibers.

13. In combination with a first optical fiber cable having a plurality of first optical fibers having resilience, and a second optical fiber cable having a plurality of second optical fibers having resilience, a device for connecting said first optical fibers to said second optical fibers to transmitting light therebetween comprising a first element, said first element including means for holding an end portion of said first cable with the axis thereof extending in a first direction, said first optical fibers having end portions extending beyond the end portion of said first cable, a surface inclined relative to said first direction, and positioning means for positioning said end portions of said first optical fibers with the outer parts thereof lying along said inclined surface and the outer ends of said first optical fibers at an intermediate portion of said inclined surface, said positioning means including means for bending said first optical fibers so that said end portions thereof exert a lateral force against said inclined surface, a second element having a forward end, said second element including means for holding an end portion of said second cable with the axis thereof extending substantially in said first direction, said second optical fibers having end portions extending beyond said end portion of said second cable, and positioning means for positioning said second optical fibers so that the outer parts of said end portions of said second optical fibers project beyond said forward end of said second element, said first and second elements having a mated position in which said outer parts of said second optical fibers lie along said inclined surface and are bent thereby so that said second optical fibers exert a lateral force against said inclined surface, and the outer ends of said second optical fibers abut said outer ends of said first optical fibers, and releasable connecting means for holding said first and second elements in said mated position and permitting said first and second elements to be moved away from each other to a separated condition upon release of said releasable connecting means.

14. A device as recited in claim 13 in which said positioning means for said first optical fibers and said positioning means for said second optical fibers include means for causing said outer ends of said first and second optical fibers to exert axial compressive forces against each other for assuring intimate contact between said outer ends of said first and second optical fibers.

15. A device as recited in claim 13 in which said means for bending said first optical fibers includes means for bending said first optical fibers in one direction adjacent said first cable, and means for bending said first optical fibers in the opposite direction adjacent said inclined surface.

16. A device as recited in claim 13 in which said positioning means for at least one of said first and second optical fibers includes means for permitting axial movement of the optical fibers associated therewith upon engagement of said outer ends of said first and said second optical fibers when said first and said said second elements are brought to said mated position.

17. A device as recited in claim 13 in which said inclined surface includes a plurality of grooves therein, said end portions of said first and said second optical fibers being in said grooves and bearing against the walls thereof.

18. A device as recited in claim 17 in which said means for bending said first optical fibers includes
a first transverse member extending transversely of said first optical fibers,
said member including a plurality of recesses having a predetermined spacing therebetween,
one of said first optical fibers being received in each of said recesses for thereby giving said first optical fibers a predetermined spacing,
said member at each of said recesses exerting a lateral force against said optical fiber therein for bending the same.

19. A device as recited in claim 18 in which said means for bending said first optical fibers includes
a second transverse member extending transversely of said first optical fibers,
said first optical fibers extending around one side of said second transverse member and around the opposite side of said first transverse member.

20. A device as recited in claim 19 in which said first element includes a clamping means for holding said first optical fibers between said second transverse member and said end portion of said first cable.

21. A device as recited in claim 20 in which
said first optical fibers are so held by said clamping means that they are substantially in the plane of said axis of said first cable,
and said second transverse member is laterally displaced from said axis so that said first optical fibers are bent laterally between said clamping means and said second transverse member,
said first optical fibers being bent laterally in the opposite direction between said second transverse member and said inclined surface.

22. A device as recited in claim 19 in which said first element includes fiber aligning means between said second transverse member and said means for holding said first cable,
said fiber aligning means of said first element including a plurality of guide means each of which is aligned with one of said recesses of said first transverse member and receives one of said first optical fibers, and a clamp means holding said first optical fibers adjacent said fiber aligning means.

23. A device as recited in claim 13 in which said second element includes
support means for engaging said second optical fibers adjacent said end portions thereof,
and means for extending said support means forwardly relative to said second element when said first and said second elements are moved from said mated position to said separated condition, whereby said support means can support said second optical fibers.

24. A device as recited in claim 23 in which said support means includes
a member extending transversely of said second element,
and a plurality of aperture means in said member,
each of said aperture means receiving one of said second optical fibers.

25. A device as recited in claim 22 in which said second element includes
fiber aligning means between said member and said means for holding said second cable,
said fiber aligning means including a plurality of guide means each of which is aligned with one of said aperture means and receives one of said second optical fibers,
and a clamp means holding said second optical fibers adjacent said fiber aligning means.

26. A device as recited in claim 24 in which said aperture means are notches.

27. A device as recited in claim 26 in which
said means for extending said support means includes a spring biasing said support means forwardly relative to said second element,
and including means for limiting the forward movement of said support means.

28. A device as recited in claim 13 including in addition a clamp means engaging said end portions of said first and said second optical fibers for holding the same in said groove means.

29. A device as recited in claim 28 including in addition
means for causing said clamp means to so engage said end portions of said first and said second optical fibers when said first and said second elements are in said mated position, and for causing said clamp means to release said end portions of said first and said second optical fibers when said first and said second elements are relatively moved away from said mated position to said separated condition.

30. A device as recited in claim 28 in which said means for causing said clamp means to so release said end portions of said first and said second optical fibers includes spring means engaging said first element and said clamp means, and biasing said clamp means away from said inclined surface.

31. A device as recited in claim 28 in which said clamp means includes a plurality of ridges thereon, said ridges extending into said grooves and engaging said end portions of said first and second optical fibers when said first and said second elements are in said mated position.

32. A device as recited in claim 28 including means on said first element holding said clamp means thereto, and cam means on said second element for engaging said clamp means and moving the same into engagement with said end portions of said first and said second optical fibers when said first and said second elements are moved from a separated condition to said mated position.

33. A device as recited in claim 32 in which said second element includes a tubular shell having a forward end, said shell having an outwardly flaring inner surface at said forward end providing said cam means for engaging said clamp means.

* * * * *